Patented July 6, 1948

2,444,827

UNITED STATES PATENT OFFICE 2,444,827

NITROMETHANE-ACETONE-ADIPIC ACID CONDENSATION POLYMER

Albin Johnson, Delmar, N. Y., assignor, by mesne assignments, to Tek Hughes, Inc., a corporation of New York No Drawing. Application August 5, 1946, Serial No. 688,429

6 Claims. (Cl. 260—63)

My invention relates to a new composition of matter and particularly to a new linear condensation polymer, the method of making it and to the fibers and threads formed therefrom.

One of the objects of my invention is to provide a new composition of matter from which attenuated fibers and threads of high strength may be formed. A further object is to provide a new synthetic thread or fiber which in the coarser sizes is well adapted for use in forming artificial bristles for brushes and the like and which may be used in the finer sizes in the manufacture of almost any fabric or article heretofore formed from threads or yarns of organic fiber.

The composition is formed by the reaction of nitromethane, acetone and adipic acid.

In forming my composition, I start with the following ingredients in the proportions indicated—

| Ingredient | Gram Molecules | Formula |
|---|---|---|
| Nitromethane | 2 | $CH_3NO_2$ |
| Acetone | 1 to 2 | $CH_3COCH_3$ |
| Adipic Acid | 1 | $COOH(CH_2)_4COOH$ |

These ingredients, together with say 0.1% (calculated on the total weight of the mixture) of titanium dioxide or any of the other well known catalysts, such as calcium hydroxide, barium hydroxide, powdered zinc, etc., are placed in a vacuum, resin still which can be heated up to at least 250° C. and which can be cooled by air or water to about 20° below the temperature at which the reaction takes place. The still should be equipped with a stirrer or mixer and also with a thermometer for indicating the temperature of the mixture.

The ingredients are stirred and heat is gradually applied until the temperature at which the reaction occurs is reached, which is about 140°–150° C. and will be evidenced by a sudden rise in temperature. Additional heat is then applied to raise the temperature to about 250° C. The vacuum is also applied to remove the water from the mixture and prevent oxidation, and the mixture is maintained under the vacuum at about 250° C., or at least below the temperature at which it will discolor, until it thickens to the proper consistency, as determined by test from time to time. When a stringy mass can be drawn out of the mixture on a glass rod thrust therein the product may be poured from the still and cooled under normal atmospheric conditions.

When cooled, the mass or sheet of material is ground to a powder and extruded under heat and pressure to form a thread or filament which is thereafter stretched or oriented under heat to increase its strength.

The final thread or filament product is tough, strong and pliable and appears quite similar to a "nylon" filament. However, it requires an extruding temperature of at least 280° C., whereas "nylon" may be extruded at temperatures of from about 230° to about 275° C., while for orienting, my thread must be heated to a temperature of about 150° C. which is considerably higher than that required for "nylon." It is impossible to extrude a mixture of powdered "nylon" and my product.

Tests of "nylon" and my plastic thread, each drawn to a diameter of 0.019", show comparative ultimate tensile strengths as follows when pulled on a bristle pulling machine.

| Nylon | Plastic thread |
|---|---|
| 120 | 100 |
| 120 | 85 |
| 100 | 80 |
| 115 | 100 |
| 130 | 110 |
| 120 | 80 |

The foregoing tests indicate that the average ultimate strength of my thread is about 93 units as compared with 118 units for "nylon." In other words, my thread is about 80% as strong as "nylon."

This application is a continuation-in-part of my application, Serial No. 544,459, filed July 11, 1944 now abandoned.

What I claim is:

1. That step in the method of making a synthetic polymer in the form of a flexible filament which comprises subjecting the following ingredients in about the proportions set forth to a condensation polymerization treatment until filaments can be drawn therefrom:

| Ingredient | Gram Molecules |
|---|---|
| Nitromethane | 2 |
| Acetone | 1 to 2 |
| Adipic Acid | 1 |

2. That step in the method of making a synthetic polymer which comprises subjecting the following ingredients in about the proportions set forth to a condensation polymerization treatment:

| Ingredient | Gram Molecules |
|---|---|
| Nitromethane | 2 |
| Acetone | 1 to 2 |
| Adipic Acid | 1 |

3. A synthetic polymer formed by subjecting a mixture comprising the following ingredients in about the proportions set forth to a condensation polymerization treatment:

| Ingredient | Gram Molecules |
|---|---|
| Nitromethane | 2 |
| Acetone | 1 to 2 |
| Adipic Acid | 1 |

4. That step in the method of making a synthetic polymer in the form of a flexible filament which comprises subjecting the following ingredients in about the proportion set forth to a condensation polymerization treatment until filaments can be drawn therefrom:

| Ingredient | Gram molecules |
|---|---|
| Nitromethane | 2 |
| Acetone | 1 |
| Adipic Acid | 1 |

5. That step in the method of making a synthetic polymer which comprises subjecting the following ingredients in about the proportions set forth to a condensation poylmerization treatment:

| Ingredient | Gram molecules |
|---|---|
| Nitromethane | 2 |
| Acetone | 1 |
| Adipic Acid | 1 |

6. A synthetic polymer formed by subjecting a mixture comprising the following ingredients in about the proportions set forth to a condensation polymerization treatment:

| Ingredient | Gram molecules |
|---|---|
| Nitromethane | 2 |
| Acetone | 1 |
| Adipic Acid | 1 |

ALBIN JOHNSON.